United States Patent [19]
Jin

[11] Patent Number: 6,018,264
[45] Date of Patent: Jan. 25, 2000

[54] PUMPING CIRCUIT WITH AMPLITUDE LIMITED TO PREVENT AN OVER PUMPING FOR SEMICONDUCTOR DEVICE

[75] Inventor: Seung Eon Jin, Seoul, Rep. of Korea

[73] Assignee: LG Semicon Co., Ltd., Chungcheongbuk-do, Rep. of Korea

[21] Appl. No.: 09/126,738

[22] Filed: Jul. 31, 1998

[30] Foreign Application Priority Data

Feb. 11, 1998 [KR] Rep. of Korea ..................... 98-3985

[51] Int. Cl.[7] ........................................... G05F 1/10
[52] U.S. Cl. .......................................... 327/536; 327/540
[58] Field of Search ................................... 327/534, 535, 327/536, 537, 540, 541, 542, 543

[56] References Cited

U.S. PATENT DOCUMENTS

| | | | |
|---|---|---|---|
| 5,027,053 | 6/1991 | Ohri et al. ............................... | 323/314 |
| 5,077,518 | 12/1991 | Han ......................................... | 323/275 |
| 5,394,026 | 2/1995 | Yu et al. .................................. | 327/536 |
| 5,412,331 | 5/1995 | Jun et al. ................................. | 326/105 |
| 5,553,030 | 9/1996 | Tedrow et al. .......................... | 365/226 |

*Primary Examiner*—Timothy P. Callahan
*Assistant Examiner*—An T. Luu

[57] ABSTRACT

The pumping circuit for pumping the internal voltage supplied to a semiconductor device is disclosed, which is directed to comparing an internal voltage with previously set two reference voltages and differently varying a swing width of an output pulse from an oscillator in accordance with a result of the comparison. When there is a big difference between the internal voltage and a desired first reference voltage, the swing width of the output pulse from the oscillator is normally set, and when the internal voltage becomes the first reference voltage, the swing width of the ouput pulse from the oscillator is decreased, and when the swing width is decreased, the increasing width of the level of the internal voltage which is pumped and supplied to the semiconductor device is decreased, so that the over pumping of the internal voltage is prevented.

23 Claims, 4 Drawing Sheets

PUMPING CIRCUIT WITH AMPLITUDE LIMITED TO PREVENT AN OVER PUMPING FOR SEMICONDUCTOR DEVICE

BACKGROUND OF THE INVENTION

1. Field of the Invention

The present invention relates to a pumping circuit which pumps an internal voltage supplied to a semiconductor device, and particularly to an improved pumping circuit for a semiconductor device which is capable of preventing an over pumping by controlling the level of a pumped internal voltage.

2. Description of the Background Art

The pumping circuit is used for pumping the level of an internal voltage when the level of the internal voltage is dropped due to the operation of a semiconductor device.

Figure 1:
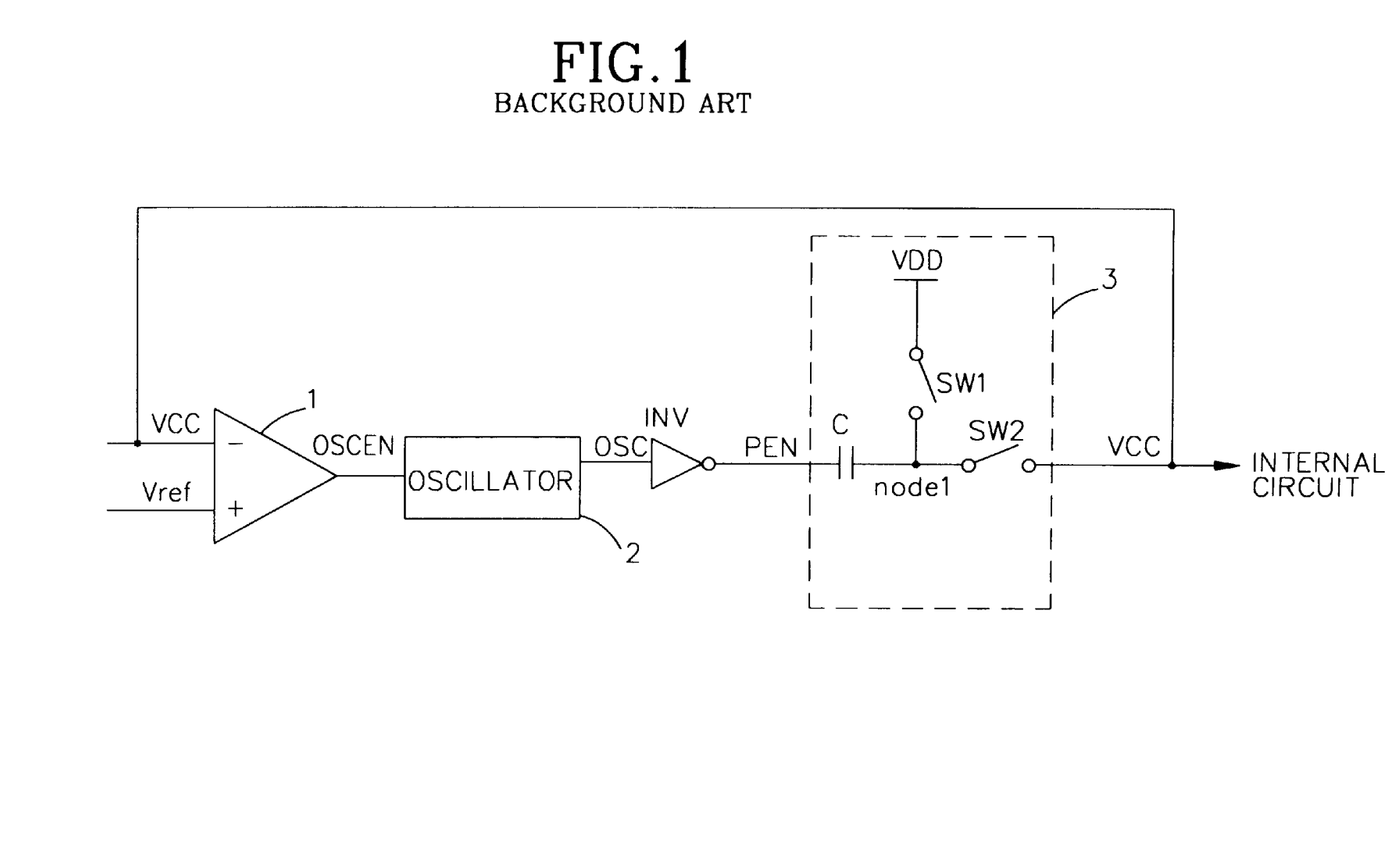
FIG. 1 is a circuit diagram illustrating a related pumping circuit for a semiconductor device.

FIG. 1 illustrates the construction of a related pumping circuit for a semiconductor device.

As shown therein, the related pumping circuit includes a comparator 1 for comparing the level of an internal voltage VCC supplied to an internal circuit with the level of a reference voltage Vref, an oscillator 2 for outputting a clock pulse signal OSC in accordance with an output signal OSCEN from the comparator 1, an inverter INV for receiving the clock pulse signal OSC and outputting a pumping clock signal PEN, and a pumping unit 3 for pumping the level of an external voltage VDD in accordance with the pumping clock signal PEN. The thusly pumped internal voltage VCC is inputted into an inverted terminal (−) of the comparator 1. The comparator 1 receives the internal voltage VCC through the inverted terminal (−) and the reference voltage Vref through the non-inverted terminal (+).

The pumping unit 3 includes a capacitor C connected with an output terminal of the inverter INV, a first switch SW1 connecting a node n1 which is one end of the capacitor C, and a second switch SW2 connecting the node n1 and an internal circuit of the semiconductor device.

The operation of the related pumping circuit for a semiconductor device will now be explained with reference to the accompanying drawing.

The level of the internal voltage VCC supplied to an internal circuit of the semiconductor device is compared with the level of the reference voltage Vref. As a result of the comparison, if the level of the internal voltage VCC is higher than the level of the reference voltage Vref, the output signal OSCEN from the comparator 1 goes low, and if the level of the internal voltage VCC is not higher, the output signal OSCEN goes high.

The inverter INV inverts a clock pulse signal OSC from the oscillator 2 and applies the pumping clock signal PEN to the capacitor C of the pumping unit 3.

If the first switch SW1 of the pumping unit 3 is closed, the voltage level of the node n1 which is the other end of the capacitor C becomes VDD. At this time, if the pumping clock signal PEN goes high, the voltage of the node n1 is increased to twice the external voltage VDD, namely, becomes 2*VDD. At the time when the increase of the voltage is finished, and the second switch SW2 is closed, the pumped voltage (2VDD=VCC) is supplied to the internal voltage of the semiconductor device and is inputted to the inverted terminal (−) of the comparator 1.

When the level of the internal voltage VCC gets below the level of the reference voltage Vref, the pumping unit 3 pumps the level of the voltage synchronously with the clock pulse signal OSC from the oscillator 2, and the pumping operation is continued until the level of the internal voltage VCC exceeds the level of the reference voltage Vref.

If the internal voltage VCC exceeds the reference voltage Vref by the continued pumping operation, the output signal OSCEN from the comparator 1 becomes goes low, and then the pumping operation is stopped.

Figure 2:
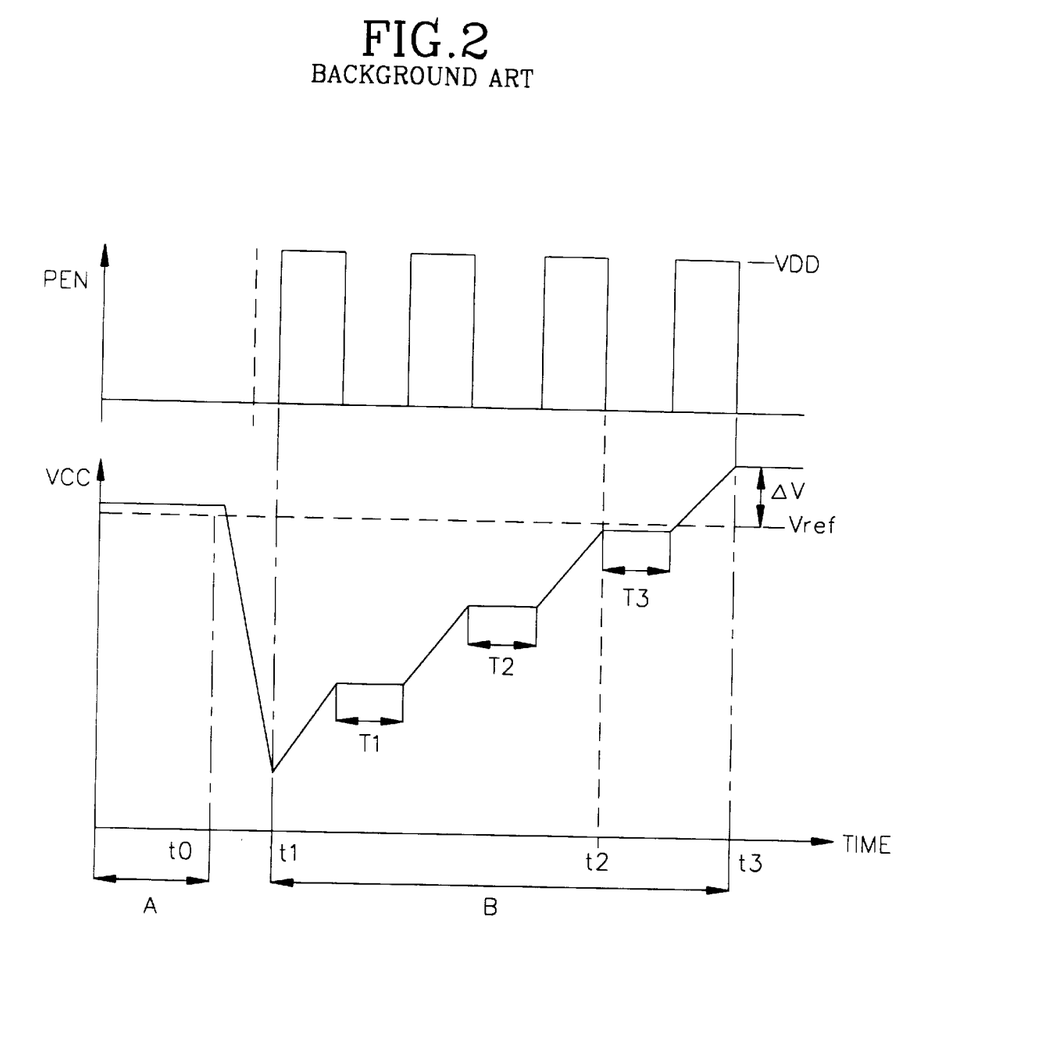
FIG. 2 is a waveform diagram illustrating output signals from each element of FIG. 1.

FIG. 2 illustrates a waveform diagram of output signals from each element of FIG. 1. In FIG. 2, interval A denotes an interval in which the internal voltage VCC is higher than the reference voltage Vref, and interval B denotes an internal in which the pumping operation is continued.

If the internal voltage VCC drops at the point t0, the pumping is started at the time t1. At every pumping operation, the comparison is performed, and the pumping is performed based on the result of the comparison. Here, ΔV1 is the voltage which is increased by the pumping operation, and each interval T1, T2 and T3 denote the time elapsed until the next pumping operation. The pumping clock signal PEN which is an output signal from the inverter INV is high during in the pumping interval.

After the pumping operation is performed four times, the internal voltage VCC exceeds the reference voltage Vref, and then the pumping operation is finished.

In addition, at the time t2 of FIG. 2, the level of the internal voltage VCC is slightly lower than the level of the reference level Vref. However, since the pumping operation is performed once at the time t2, at the time t3 when the pumping operation is finished at time t3, the internal voltage VCC goes above the reference voltage Vref by ΔV. Therefore, the increased voltage ΔV is similar to the voltage ΔV1.

In the related pumping circuit for a semiconductor device, since the reference voltage Vref and the internal voltage VCC are compared for the pumping operation, the internal voltage (VCC=Vref+ΔV), when the pumping operation is finished, is higher than the reference voltage Vref by ΔV. The voltage ΔV is proper as it is closer to 0; however, the voltage ΔV may be almost as large as the voltage ΔV1. Therefore, an unstable voltage may be supplied to the internal circuit of the semiconductor device due to this over pumping, so that the operation of the internal circuit becomes unstable.

In order to overcome the above-described problem, a pumping circuit having a small pumping capability and a pumping circuit having a large pumping circuit are used, in which a circuit capable of forming additional discharging path is provided for thereby decreasing the level of the internal voltage VCC.

However, construction of such circuit is complicated.

SUMMARY OF THE INVENTION

Accordingly, it is an object of the present invention to provide a pumping circuit for a semiconductor device which overcomes the aforementioned problems encountered in the background art.

It is another object of the present invention to provide a pumping circuit for a semiconductor device which is capable of preventing over pumping of an internal voltage by providing a simpler circuit.

It is another object of the present invention to provide a pumping circuit for a semiconductor device which is capable of providing a stable internal voltage supplied to an internal circuit after a pumping operation by controlling a swing width of a voltage pumped in accordance with the level of the internal voltage.

To achieve the above objects, there is provided a pumping circuit for a semiconductor device which includes a first comparator for comparing an internal voltage supplied to an internal circuit of a semiconductor device with a level of a first reference voltage, an oscillator for outputting a pulse signal in accordance with an output signal from the first comparator, a second comparator for being enabled in accordance with the output signal from the first comparator and comparing a level of the internal voltage with a level of a second reference voltage, a driving unit for differently outputting a swing width of a pumping enable signal in accordance with a logic state of the pulse signal from the oscillator and a logic state of an output signal from the second comparator, and a pumping unit for pumping an external voltage based on the level of the pumping enable signal, wherein the pumped voltage is supplied to the internal circuit of the semiconductor device as an internal voltage and is fed back to the first comparator and the second comparator.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 3:
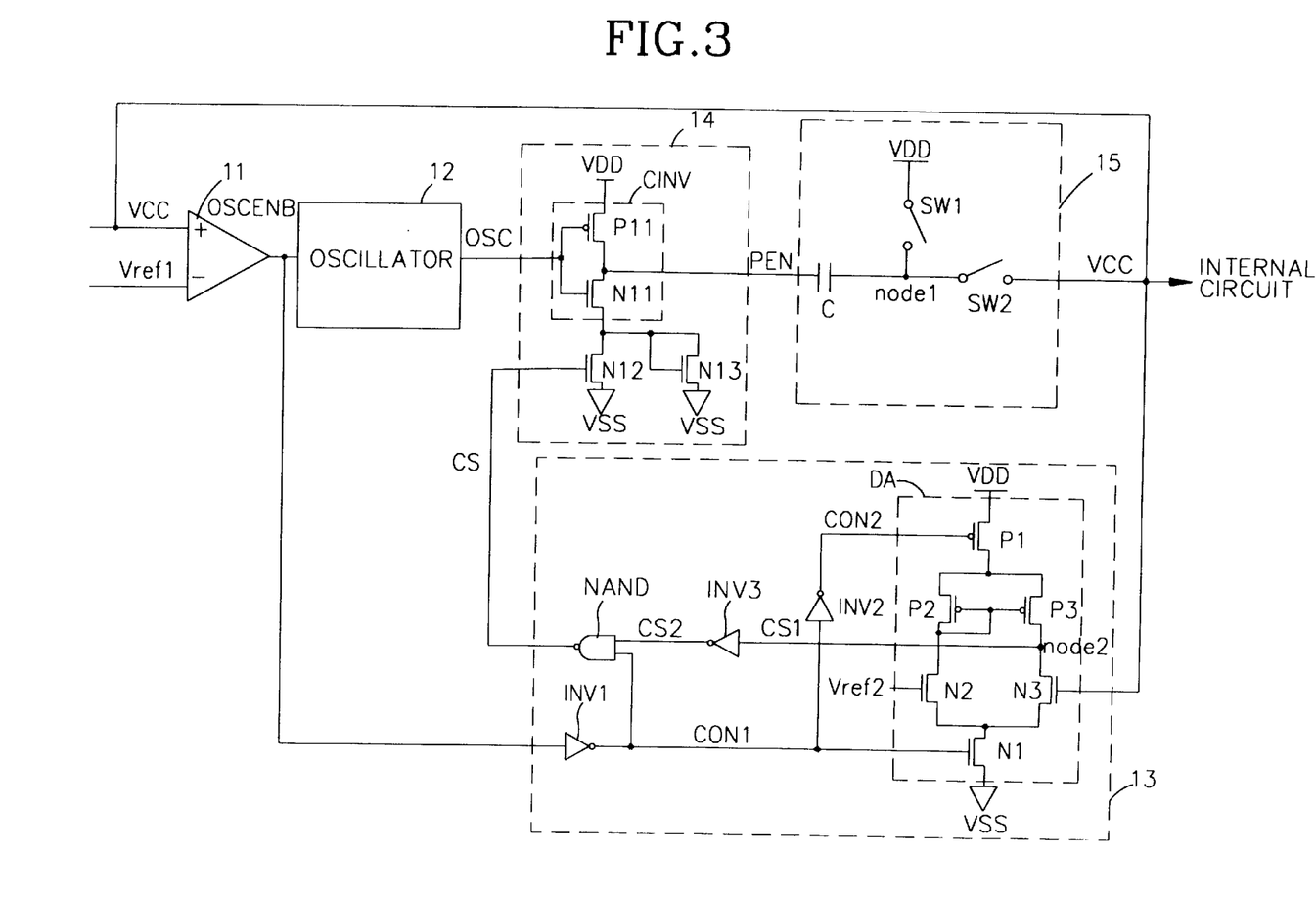
FIG. 3 is a circuit diagram illustrating a pumping circuit for a semiconductor device according to the present invention.

FIG. 3 illustrates a pumping circuit for a semiconductor device according to the present invention.

As shown, the pumping circuit for a semiconductor device according to the present invention includes a first comparator 11 for comparing the level of an internal voltage VCC supplied to an internal circuit of a semiconductor device with a first reference voltage Vref1, an oscillator 12 for outputting a pulse signal OSC in accordance with an output signal OSCENB from the first comparator 11, a second comparator 13 for comparing the level of the internal voltage VCC with the level of a second reference voltage Vref2, a driving unit 14 differently outputting a pumping enable signal PEN having different size in accordance with a logic stage of an output signal CS from the second comparator 13, and a pumping unit 15 for pumping an external voltage VDD in accordance with the level of the pumping enable signal PEN. Here, the pumped voltage is supplied to the internal circuit of the semiconductor device as an internal voltage VCC and is fed back to the first comparator 11 and the second comparator 13.

The first comparator 11 receives an internal voltage VCC through a non-inverted terminal (+) and a first reference voltage Vref1 through an inverted terminal (−) and outputs a high signal OSCENB if the internal voltage VCC is higher than the reference voltage Vref1.

The second comparator 13 includes a first inverter INV1 for inverting the output signal OSCENB from the first comparator 11, a second inverter INV2 for inverting an output signal CON1 from the first inverter INV1, a differential amplifier DA enabled by the output signal CON1 and an output signal CON2 from the second inverter INV2 for comparing the levels of the internal voltage VCC with the second reference voltage Vref2 and outputting an output signal CS as a result of the comparison, a third inverter INV3 for inverting an output signal CS1 from the differential amplifier DA, and a NAND-gate NAND for NANDing the output signal CS2 from the third inverter INV3 and the output signal CON1 from the first inverter INV1 and outputting an output signal CS.

The differential amplifier DA includes a PMOS transistor P1 the gate of which receives an output signal from the second inverter INV2 and the source of which is connected with an external voltage VDD, an NMOS transistor N1 the gate of which receives an output signal from the first inverter INV1 and the source of which is connected with a ground, two NMOS transistors N3 and N2 the gates of which receive the internal voltage VCC and the second reference voltage Vref, respectively and the sources of which are connected with the drain of the NMOS transistor N1, respectively, and two PMOS transistors P2 and P3 connected in series between the PMOS transistor P1 and two NMOS transistors N2 and N3 for forming a current mirror. Here, the drain terminal of the PMOS transistor P3 becomes an output terminal n2.

The driving unit 14 includes a CMOS inverter CINV operated in accordance with a pulse signal OSC from the oscillator 12, an NMOS transistor N12 is connected in series between the CMOS inverter CINV and the ground, and the gate of which receive an output signal CS of the second comparator 13, and an NMOS transistor N13 is connected in parallel between the NMOS transistor N12 and the ground and the gate and drain of which are commonly connected. Here, the output terminal of the CMOS inverter CINV is connected with the pumping unit 15.

The construction of the pumping unit 15 is the same as that of FIG. 1. Therefore, the description thereof will be omitted.

The operation of the pumping circuit for a semiconductor device according to the present invention will now be explained with reference to the accompanying drawings.

The internal voltage VCC is inputted into a non-inverted terminal (+) of the first comparator 11, and the first reference voltage Vref 1 is inputted into an inverted terminal (−). The level of the internal voltage VCC is compared with the level of the first reference voltage Vref 1 by the comparator 11.

If the internal voltage VCC is lower than the first reference voltage Vref1, the output signal OSCENB from the first comparator 11 goes low. Otherwise the output signal OSCENB goes a high.

When the output signal OSCENB goes low, the oscillator 12 is enabled and drives the driving unit 14, and when the output signal OSCENB goes high, the same is disabled.

The output signal OSCENB is inputted into the first inverter INV1 of the second comparator 13. The output signal CON1 from the first inverter INV1 is inputted into the gate of the NMOS transistor N1 of the differential amplifier DA and is inverted by the second inverter INV2, which then is inputted into the gate of the PMOS transistor P1. In addition, the output signal CON1 is inputted into the NAND-gate NAND.

The differential amplifier DA is enabled by the output signal CON1, and the internal voltage VCC and the second reference voltage Vref2 are inputted into the gates of the NMOS transistors N2 and N3, respectively, and the levels of the internal voltage VCC and the second reference voltage Vref2 are compared. Here, the level of the second reference voltage Vref2 is lower than the level of the first reference voltage Vref1.

The output signal CS1 is inverted by the third inverter INV3 through the output terminal n2, and the NAND-gate NAND NANDs the output signal CON1 and the output signal CS1 and outputs an output signal CS, and the NMOS transistor N12 of the driving unit 14 is turned on/off in accordance with the output signal CS.

The driving unit 14 is enabled by the output signal OSC from the oscillator 12, and in the driving unit 14, the CMOS inverter CINV and the NMOS transistor N12 are connected in series, and the NMOS transistor N13 (which works as a diode) is connected in parallel with the NMOS transistor N12. Therefore, the level of the pumping enable signal PEN inputted from the driving unit 14 to the pumping unit 15 is divided into two cases; namely, the NMOS transistor N12 is turned on and turned off.

If the output signal OSC from the oscillator 12 goes low, the PMOS transistor P11 of the CMOS inverter CINV is turned on, and the NMOS transistor N11 is turned off, so that the level of the pumping enable signal PEN becomes the level of the external voltage VDD.

On the other hand, if the output signal OSC goes high, the PMOS transistor P11 of the CMOS inverter CINV is turned off, and the NMOS transistor N11 is turned on. At this time, when the NMOS transistor N12 is turned on, the pumping enable signal PEN goes to ground. At this time, when the NMOS transistor N12 is turned off, in the NMOS transistor N13 (which works as a diode), the voltage is dropped by the threshold voltage Vth, so that the pumping enable signal PEN goes to threshold voltage Vth.

Namely, if the NMOS transistor N12 is turned on, the voltage swing width of the pumping enable signal PEN ranges from the external voltage VDD to the ground voltage, and if the NMOS transistor N12 is turned off, the voltage swing width of the pumping enable signal PEN ranges from the external voltage VDD to the threshold voltage Vth.

As a result of the comparison between the internal voltage VCC and the second reference voltage Vref2 by the second comparator 13, the voltage level of the pumping enable signal PEN which is supplied from the driving unit 14 to the pumping unit 15 is divided into two cases. The level of the voltage pumped by the pumping unit 15 also becomes different.

Therefore, the pumping operation is started when the internal voltage VCC supplied to the semiconductor internal circuit is lower than the first reference voltage Vref1. If the internal voltage VCC is lower than the second reference voltage Vref2, the level of the pumped internal voltage VCC is 2*VDD which is identical to the voltage pumped in the related art. If the internal voltage VCC is higher than the pumped second reference voltage Vref2, the level of the internal voltage VCC is lower than 2*VDD.

The following three cases are defined: the internal voltage VCC is higher than the first reference voltage Vref1, the internal voltage VCC is lower than the second reference voltage Vref2, and the internal voltage VCC is lower than the first reference voltage Vref1 but higher than the second reference voltage Vref2. The operation of the circuit according to the present invention will be explained in more detail in the above cases with reference to FIG. 4.

Figure 4:
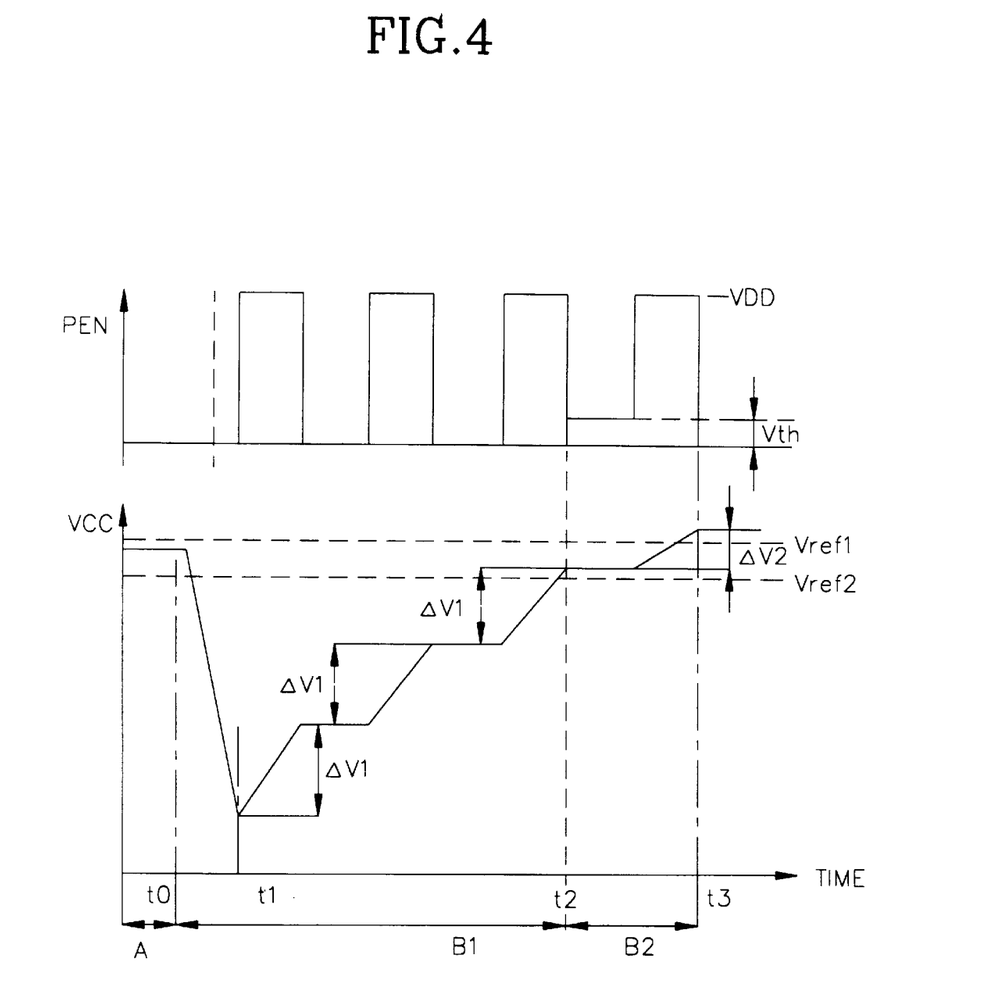
FIG. 4 is a waveform diagram illustrating output signals from each element of FIG. 3.

FIG. 4 illustrates waveform diagrams of output signals from each element of FIG. 3. As shown, in interval A the interval voltage VCC is higher than the reference voltage Vref1, and the interval B denotes a state that the pumping operation is being performed.

The first case will now be explained. In the interval A, the internal voltage VCC is higher than the first reference voltage Vref1, and the output signal OSCENB from the first comparator 11 high, and the output signal OSC from the oscillator 12 remains high. The PMOS transistor P11 of the CMOS inverter CINV is turned off, and the NMOS transistor N11 is turned on.

The output signal CON1 from the first inverter INV1 of the second comparator goes low, and the output signal CS from the NAND-gate NAND goes high. Therefore, the NMOS transistor N12 connected in series with the CMOS transistor CINV is turned on. The output signal PEN from the driving unit 14 goes ground, so that the internal voltage VCC is not pumped.

The second case will now be explained. At the timing t0, when the internal circuit of the semiconductor device is operated, the internal voltage VCC goes lower than the level of the first reference voltage Vref1, and at the time t1, the internal voltage VCC goes lower than the second reference voltage Vref2.

At the time t1, the output signal OSCENB from the first comparator 11 goes low, and the oscillator 12 is enabled, and the output signal from the oscillator 12 becomes a clock pulse state which is changed from low to high.

In addition, the output signal CON1 from the first inverter INV1 of the second comparator 13 goes high, and the output signal CON2 from the second inverter INV2 goes low. The NMOS transistor N1 is turned on by the output signal CON1, and the PMOS transistor P1 is turned on by the output signal CON2, so that the differential amplifier DA is enabled.

In the differential amplifier DA, the internal voltage VCC is received through the NMOS transistor N3, and the second reference voltage Vref2 is received through the NMOS transistor N2, so that the levels of the internal voltage VCC and the second reference voltage Vref2 are compared. Since the internal voltage is lower than the second reference voltage Vref2, the output signal CSI outputted to the drain of the NMOS transistor N3, namely, the output terminal n2 which is a common connection point of the NMOS transistor N3 and the PMOS transistor P3, goes high, and the output signal CS2 from the third inverter INV3 goes low. In addition, the output signal CS from the NAND-gate NAND goes high, and the NMOS transistor N12 of the driving unit 14 is turned on.

In the above state, if the output signal OSC from the oscillator 12 goes low, the PMOS transistor P11 of the driving unit 14 is turned on, and the NMOS transistor N11 is turned off. Therefore, the voltage of the pumping enable signal PEN becomes an external voltage VDD, In addition, if the output signal OSC goes high, the PMOS transistor P11 is turned off, and the NMOS transistor N11 is turned on, so that the voltage of the pumping enable signal PEN goes to ground. At this time, the waveform of the pumping enable signal PEN corresponds to the interval B1 of FIG. 4. As shown therein, the swing width ranges from ground to the external voltage VDD.

The pumping unit 15 is operated identically to the related art. The internal voltage VCC outputted through the output terminal n1 of the pumping unit 15 is increased by $\Delta V1$ rather than that at the time when the pumping operation is started. Here, the voltage $\Delta V1$ denotes the amount of the internal voltage which is increased by one time pumping.

During the pumping operation, the internal voltage VCC and the first reference voltage Vref1 and the internal voltage VCC and the second reference voltage Vref2 are compared. The pumping operation is performed based on the result of the comparison. The time t2 denotes the time after the operation is performed three times.

The third case will be explained. The internal voltage VCC at the time t2 is lower than the first reference voltage Vref1 but higher than the second reference voltage Vref2. In this case, the operation of the first comparator 11 and the oscillator 12 is performed identically to the operation of the second case.

The differential amplifier DA of the second comparator 13 is enabled by the output signal OSCENB from the first comparator 11, and the levels of the internal voltage VCC and the second reference voltage Vref2 are compared.

If the internal voltage VCC is higher than the second reference voltage Vref2, the voltage of the output terminal node 2 goes low, and the signal CS2 inverted by the third inverter INV3 is inputted into the NAND-gate NAND, and the output signal CS from the NAND-gate NAND goes low. The NMOS transistor N12 of the driving unit 14 is turned off. Therefore, in the driving unit 14, the PMOS transistor P11, the NMOS transistor N11, and the NMOS transistor N13 (which works as a diode) are connected in series between the external voltage VDD and the ground.

In this state, if the output signal OSC from the oscillator 12 goes high, the PMOS transistor P11 of the CMOS inverter CINV is turned on, and the NMOS transistor N11 is turned off, so that the voltage of the pumping enable signal PEN becomes an external voltage VDD.

On the other hand, if the output signal OSC goes low, the PMOS transistor P11 of the driving unit 14 is turned off, and the NMOS transistor N11 is turned on, so that the voltage of the pumping enable signal PEN becomes a threshold voltage Vth of the NMOS transistor N13, and the waveform of the pumping enable signal PEN corresponds to the interval B2 of FIG. 4. As shown therein, the swing width is ranged from the threshold voltage Vth of the NMOS transistor N13 to the external voltage VDD.

The pumping unit 15 receives a pumping enable signal PEN for thereby performing a pumping operation. The internal voltage VCC outputted through the output terminal node 1 of the pumping unit 15 is higher by ΔV2 than that at the time when the pumping operation is started.

If the internal voltage VCC is lower than the level of the first reference voltage Vref1 but higher than the level of the second reference voltage Vref2, the voltage ΔV2 is pumped, which is less than the voltage ΔV1.

After the time t3 when four pumping operations are performed, since the internal voltage VCC is higher than the first reference voltage Vref1, the pumping operation is finished.

As described above, in the present invention, when there is a predetermined difference between the internal voltage and the first reference voltage, the swing width of the output pulse of the oscillator is normally set, and when the internal voltage reaches the first reference voltage, the swing width of the output pulse of the oscillator is decreased. When the swing width is decreased, the increase of the level of the internal voltage which is pumped and supplied to the semiconductor device is decreased, so that it is possible to prevent over pumping of the internal voltage, and thereby a stable internal voltage is supplied to the internal device of the semiconductor.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A pumping circuit for a semiconductor device, comprising:

a first comparator for comparing an internal voltage supplied to an internal circuit of a semiconductor memory device with a level of a first reference voltage;

an oscillator for outputting a pulse signal in accordance with an output signal from said first comparator;

a second comparator for being enabled in accordance with an output signal from said first comparator and comparing a level of the internal voltage with a level of a second reference voltage;

a driving unit for outputting a swing width of a pumping enable signal in accordance with a logic state of said pulse signal from the oscillator and a logic state of an output signal from said second comparator; and a pumping unit for pumping an external voltage based on the level of said pumping enable signal, wherein said pumped voltage is supplied to said internal circuit of said semiconductor memory device as said internal voltage and is fed back to said first comparator and said second comparator.

2. The circuit of claim 1, wherein said first reference voltage is higher than said second reference voltage.

3. The circuit of claim 1, wherein said first comparator receives said internal voltage through a non-inverted terminal of the same and receives said first reference voltage through an inverted terminal and outputs a high level enable signal when said internal voltage is higher than said first reference voltage.

4. The circuit of claim 1, wherein said oscillator is enabled when said internal voltage is lower than said first reference voltage.

5. The circuit of claim 1, wherein said second comparator is enabled by said output signal from said first comparator.

6. The circuit of claim 1, wherein said second comparator includes a differential amplifier.

7. The circuit of claim 1, wherein said second comparator includes:

a first inverter for inverting said output signal from said first comparator;

a second inverter for inverting an output signal from said first inverter;

a differential amplifier for being enabled by output signals from said second inverter and first inverter and comparing said level of said internal voltage with said level of said second reference voltage;

a third inverter for inverting an output signal from said differential amplifier; and a NAND-gate for NANDing output signals from said third inverter and said first inverter and outputting to said driving unit.

8. The circuit of claim 7, wherein said differential amplifier includes:

a first PMOS transistor a gate of which receives said output signal from the second inverter and a source of which is connected with said external voltage;

a first NMOS transistor a gate of which receives said output from the first inverter and a source of which is connected with a ground;

second and third NMOS transistors gates of which receive said internal voltage and said second reference voltage, respectively, and sources of which are commonly connected with a drain of said first NMOS transistor; and second and third PMOS transistors connected in series between said first PMOS transistor and said second and third NMOS transistors for thereby forming a current mirror, wherein a drain terminal of said third PMOS transistor becomes an output terminal.

9. The circuit of claim 1, wherein said driving unit includes:

a CMOS inverter for being operated in accordance with a pulse signal from said oscillator;

a first NMOS transistor connected in series between said CMOS inverter and a ground for receiving said output signal of the second comparator through said gate of the same; and a second NMOS transistor, a gate and drain of which are commonly connected, connected in parallel with said first NMOS transistor, wherein an output terminal of said CMOS inverter is connected with the pumping unit.

10. The circuit of claim 9, wherein a first switching transistor is an NMOS transistor.

11. The circuit of claim 9, wherein said CMOS inverter includes:

a PMOS transistor receiving a pulse signal from said oscillator from said gate of the same, a source of which is connected with said external voltage; and a third NMOS transistor a gate of which receives a pulse signal from said oscillator, a drain of which is connected with a drain of the PMOS transistor, and a source of which is connected with a drain of said first NMOS transistor.

12. The circuit of claim 1, wherein said pumping unit includes:

a capacitor one end of which is connected with an output terminal of said driving unit;

a first switch connecting said external voltage with said other end of said capacitor; and a second switch connecting said other end of said capacitor and said internal circuit of said semiconductor memory device.

13. A pumping circuit for a semiconductor device comprising:

a first comparator structured and arranged to compare a supplied voltage with a first reference voltage;

an oscillator structured and arranged to output a pulse signal in accordance with an output signal from said first comparator;

a second comparator that is enabled in accordance with an output signal from said first comparator, said second comparator structured and arranged to compare said supplied voltage with a second reference voltage;

a driving unit structured and arranged to output a swing width of a pumping enable signal in accordance with a logic state of said pulse signal output from said oscillator and a logic state of an output signal output from said second comparator; and a pumping unit structured and arranged to pump an external voltage based on said pumping enable signal.

14. The circuit of claim 13, wherein said first reference voltage is higher than said second reference voltage.

15. The circuit of claim 13, wherein said first comparator includes a non-inverted terminal and an inverted terminal, wherein said non-inverted terminal receives said supplied voltage and said inverted terminal receives said first reference voltage.

16. The circuit of claim 13, wherein said oscillator is enabled when said supplied voltage is lower than said first reference voltage.

17. The circuit of claim 13, wherein said second comparator is enabled by said output signal from said first comparator.

18. The circuit of claim 13, wherein said second comparator includes a differential amplifier.

19. The circuit of claim 13, wherein said second comparator includes:

a first inverter structured and arranged to invert said output signal from said first comparator;

a second inverter structured and arranged to invert an output signal from said first inverter;

a differential amplifier that is enabled by output signals from said second inverter and first inverter, said differential amplifier structured and arranged to compare said supplied voltage with said second reference voltage;

a third inverter structured and arranged to invert an output signal from said differential amplifier; and a NAND-gate structured and arranged to NANDing output signals from said third inverter and said first inverter and outputting to said driving unit.

20. The circuit of claim 19, wherein said differential amplifier includes:

a first PMOS transistor, a gate of which receives an output signal from said second inverter and a source of which is connected to said external voltage;

a first NMOS transistor, a gate of which receives said output from said first inverter and a source of which is connected with a ground;

second and third NMOS transistors, gates of which receive said supplied voltage and said second reference voltage, respectively, and sources of which are commonly connected with a drain of said first NMOS transistor; and second and third PMOS transistors connected in series between said first PMOS transistor and said second and third NMOS transistors forming a current mirror, a drain terminal of said third PMOS transistor serving as an output terminal.

21. The circuit of claim 13, wherein said driving unit includes:

a CMOS inverter that is operated in accordance with a pulse signal from said oscillator, wherein an output terminal of said CMOS inverter is connected with said pumping unit;

a first NMOS transistor connected in series between said CMOS inverter and a ground, said first NMOS transistor structured and arranged to receive said output signal of the second comparator through a gate of said first NMOS transistor; and a second NMOS transistor, a gate and drain of which are commonly connected, connected in parallel with said first NMOS transistor.

22. The circuit of claim 21, wherein said CMOS inverter includes:
- a PMOS transistor receiving a pulse signal from said oscillator from said gate of said PMOS transistor, a source of which is connected with said external voltage; and
- a third NMOS transistor, a gate of which receives a pulse signal from said oscillator, a drain of which is connected with a drain of said PMOS transistor, and a source of which is connected with a drain of said first NMOS transistor.

23. The circuit of claim 13, wherein said pumping unit includes:
- a capacitor, a first end of which is connected with an output terminal of said driving unit;
- a first switch connecting said external voltage with a second end of said capacitor; and
- a second switch connecting said second end of said capacitor with said supplied voltage.

* * * * *